United States Patent [19]

Amstutz et al.

[11] Patent Number: 4,697,884

[45] Date of Patent: Oct. 6, 1987

[54] LIQUID CRYSTAL DISPLAY HAVING DEGREE OF TWIST AND THICKNESS FOR IMPROVED MULTIPLEXING

[75] Inventors: Hermann Amstutz, Mellingen; Dieter Heimgartner, Baden; Meinolph Kaufman, Baden-Rütihof; Terry J. Scheffer, Forch, all of Switzerland

[73] Assignee: BBC Brown, Boveri & Company, Limited, Baden, Switzerland

[21] Appl. No.: 908,667

[22] Filed: Sep. 17, 1986

Related U.S. Application Data

[63] Continuation of Ser. No. 626,380, Jun. 29, 1984, Pat. No. 4,634,229.

[30] Foreign Application Priority Data

Jul. 12, 1983 [CH] Switzerland ................. 3819/83
Oct. 28, 1983 [CH] Switzerland ................. 5835/83

[51] Int. Cl.$^4$ ................................................ G02F 1/13
[52] U.S. Cl. ............................... 350/334; 350/341; 350/346
[58] Field of Search ................. 350/333, 334, 341, 346

[56] References Cited

U.S. PATENT DOCUMENTS

| 3,656,834 | 4/1972 | Haller | 350/350 R |
| 4,143,947 | 3/1979 | Aftergut et al. | 350/334 |
| 4,362,771 | 12/1982 | Umeda et al. | 350/343 X |
| 4,496,220 | 1/1985 | Goscianski | 350/341 |
| 4,505,548 | 3/1985 | Berreman et al. | 350/341 X |
| 4,521,080 | 6/1985 | Funada et al. | 350/341 |
| 4,564,266 | 1/1986 | Durand et al. | 350/346 X |
| 4,579,425 | 4/1986 | Ishii et al. | 350/346 |

FOREIGN PATENT DOCUMENTS

| 2747147 | 5/1978 | Denmark . |
| 2416519 | 8/1979 | France . |
| 57-133438 | 8/1982 | Japan . |
| 2017327 | 10/1974 | United Kingdom . |
| 2076554 | 12/1981 | United Kingdom . |
| 2087583 | 5/1982 | United Kingdom . |

OTHER PUBLICATIONS

Nara et al., "Multiplexing for the Guest—Host Mode Using a Nematic Cholesteric Mixture With Long Pitch", J. Appl. Phys., 49(7), Jul. 1978, pp. 4277–4279.
Japanese Publ. 60-73525, published Apr. 25, 1985 (Hitachi 3).
Japanese Publ. 60-16225 and 60-162226, published Aug. 24, 1985 (Hitachi 4).
British Application 82-18821, filed Jun. 29, 1982; published Jan. 25, 1984 (Raynes).
Japanese Publication 57-133438, published Aug. 18, 1982 (Hitachi 1).
Japanese Publication 60-5011, published Mar. 20, 1985 (Hitachi 2).

Primary Examiner—John K. Corbin
Assistant Examiner—Richard F. Gallivan
Attorney, Agent, or Firm—Oblon, Fisher, Spivak, McClelland, & Maier

[57] ABSTRACT

A liquid crystal display based on the bistability effect, wherein the distance between the support plates is smaller than 10 μm and the total twist of the liquid crystal is between 180° and 360°, preferably about 270°. Over the entire viewing area of the display, randomly distributed spacers are provided. Because of these measures, the range of the bistable action is so narrowed that the display can be driven with operating voltages outside this range, using conventional multiplexing techniques. A high degree of multiplexing with short switching times and excellent contrast is obtained. The range of viewing angles is very large and independent of the direction of illumination.

15 Claims, 11 Drawing Figures

LIQUID CRYSTAL DISPLAY HAVING DEGREE OF TWIST AND THICKNESS FOR IMPROVED MULTIPLEXING

This is a continuation of application Ser. No. 636,380, filed June 29, 1984, now U.S. Pat. No. 4,634,229.

BACKGROUND OF THE INVENTION

1. Field of the Invention

This invention relates to a liquid crystal display including a nematic liquid crystal with positive dielectric anisotropy and twisted configuration and having as well chiral addition, and at least a polarizer, wherein the support plates of the display cell exhibit orientation layers, of which at least one produces in the adjacent liquid crystal layer a tilt angle of more than 5°.

2. Discussion of the Background

Such a display is known from J. App. Phys. 53, December 1982, 8599–8606 (corresponding to GB-A 2,087,583). The liquid crystal in the known display is twisted 360° and the tilt angle is about 35°. By the great twist a bistability effect is achieved so that for an applied holding voltage two differently twisted liquid crystal configurations exist. Switching from one configuration to the other occurs by momentary raising or lowering of the withstand voltage. Changing of the optical properties is made visible by means of crossed polarizers by use of the Schadt-Helfrich effect (Appl. Phys. Lett. 1B (1971) 127), i.e., the orientation directions of the orientation layers are either parallel or perpendicular to the vibrational direction of the polarizers, and the product of liquid crystal layer thickness d and birefringence $\Delta n$ is great in comparison with the wavelength of light. The chiral doping is so selected that a ratio of layer thickness d to pitch p of the twist of about 0.98 results. The main interest is in range 0.95 to 1.10. Above 1.15 the bistability disappears and below 0.95 the switching times become too long. Layer thickness d is 15 $\mu$m. The measurements described in the publication go to d/p=0.9. Also a value of d/p=0.750 is mentioned, and a cell with d=7 $\mu$m is also considered. This known display is controlled so that it is written by the line. Since it must be continuously renewed, only a few lines can be written. This means that the degree of multiplexing is low and a large dot matrix display is not achievable.

In U.S. Pat. No. 4,143,947 a liquid crystal display is described in which the decay time after an electric activation is to be reduced. The liquid crystal exhibits a twisted configuration, which is caused by orientation layers rotated 90° in relation to one another on the cell plates. A chiral doping is provided so that a natural pitch p between d and 4d (d=layer thickness) results. As a result, twist angles of 90° or 270° are formed. The dielectric anisotropy is positive, and the change of the optical properties with the application of a voltage is made visible by the Schadt-Helfrich effect. The liquid crystal layer thickness is 12.5 $\mu$m. The described display exhibits no advantages in regard to multiplexing capability in comparison with conventional liquid crystal displays of the Schadt-Helfrich type. They thus especially have a relatively flat characteristic curve and a strong viewing angle dependence. Therefore it is not suitable for large displays with high information density.

Finally, from JP-A-57 133 438 a liquid crystlal display is known which exhibits a twist angle of 270°. The optical changes with the application of a voltage are made visible by the "guest-host effect" (Heilmeier et al. in "Molecular Crystals and Liquid Crystals" 1969, pp 293–304 and/or Appl. Phys. Lett. Aug. 1, 1968, 91,92), i.e., the liquid crystal is doped with a dichroic dye, and the cell is provided with an input polarizer, whose vibrational direction is parallel to the orientation layer. This known display is also unsuitable for high degrees of multiplexing, i.e., because of too low a contrast.

SUMMARY OF THE INVENTION

Accordingly, the objects of this invention are to provide a new and improved liquid crystal display, which can be controlled according to a conventional multiplexing process (preferably according to IEEE Trans. El. Dev. ED-21, pp 146–155) with a high degree of multiplexing, and which has a great viewing angle range with high contrast.

These and other objects are attained by providing a display of the type initially described, wherein:

the twist $\phi$ of the liquid crystal is equal to or greater than 180° and less than 360°;

the doping with the chiral addition is such that d/p=0.50 ... 95;

the layer thickness d of the liquid crystal is less than 10 $\mu$m;

the vibrational direction at least of the front polarizer forms with orientation direction of the front orientation layer such an angle that the originally linear polarized light by twist $\phi$ and birefringence $\Delta n$ of the liquid crystal, depending on the applied operating voltage, is differently elliptically polarized, and the contrast of the display is optimized;

switching of the display takes place in the way usual for multiplexing controls by the direct transition from a first to a second operating voltage, whereby the two operating voltages are outside of any bistability range; and spacers are distributed over the visible face of the display.

This invention is based above all on the knowledge that the bistability effect, described in the above mentioned publication, is narrowed in regard to its voltage range by reducing twist $\phi$ in combination with a suitable reduction of the ratio d/p and the tilt angle, so that with control voltages outside this range a very high degree of multiplexing can be obtained.

In addition, the invention is based on the idea of making the optical changes of the display visible by use of the birefringence of the liquid crystal. By elliptically polarized light being produced by the particular orientation of the input polarizer, light which after its passage through the liquid crystal, depending on the applied operating voltage, exhibits a different polarization state, which then can be detected with particular sensitivity. Since the polarization state is based on the interference of the two light sources which are produced on entrance, the spacers distributed over the visual surface must provide a very constant layer thickness of the liquid crystal.

Displays according to the invention exhibit very steep characteristic curves and very high multiplex rates with high contrast, and a great angle of view range as well as fast switching times can be obtained. Thus, displays according to the invention are eminently suitable for large dot matrix displays.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
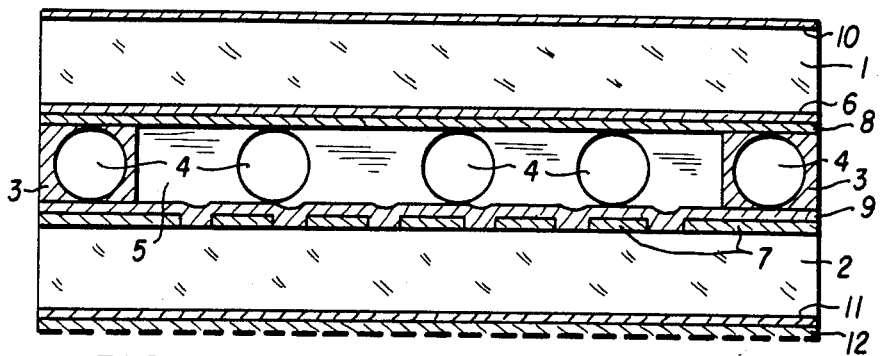
FIG. 1 is a cross-sectional view of the display according to the invention.

Referring now to the drawings, wherein like reference numerals designate identical or corresponding parts throughout the several views, the liquid crystal display shown in FIG. 1 consists of two glass support plates 1 and 2 which form a cell with a border 3. The border 3, as usual, consists of an epoxy cement which contains glass fiber spacers 4. Additional spacers 4 are randomly distributed between the support plates 1 and 2 over the entire viewing area of the display. A nematic liquid crystal 5 with positive dielectric anisotropy containing a chiral additive is filled into the cell. The inner surfaces of each support plate 1 and 2 have parallel strips of $In_2O_3$ electrode layers 6 and 7, whereby the direction of the strips on the one support plate 1 is perpendicular to the direction of the strips on the other support plate 2. In this manner, a dot matrix display is formed. But other electrode shapes are also possible, such as, e.g., the known seven-segment arrangement. Orientation layers 8 and 9 are applied over the electrode layers 6 and 7 and over the the spaces between these electrode layers. A linear sheet-type linear polarizer 10 is bonded to the outside of the front support plate 1. For transmissive operation a linear polarizer 11 is also bonded to the outside of the rear support plate 2. For reflective operation, a diffusely scattering, metallic, external reflector 12 is placed behind this polarizer 11 (indicated by the dashed line in FIG. 1). Such a reflector is known, e.g. from CH-B-618018. The polarizer 11 can also be left out. By this means the brightness is improved but the contrast ratio is lowered.

Figure 1A:
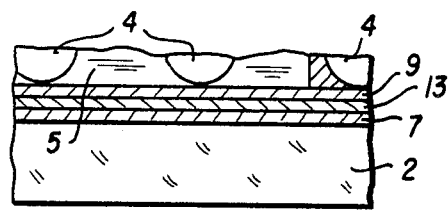
FIG. 1a is a cross-sectional view of a liquid crystal display including an internal reflector.

In FIG. 1a, the situation is shown when, instead of an external reflector 12, an internal reflector 13 is used, as is known, e.g. from EP-B-060380. As the section shows, this reflector is placed between the electrode layer 7 and the orientation layer 9. Otherwise, except for the polarizer 11, the same elements are present as in FIG. 1.

Figure 2:
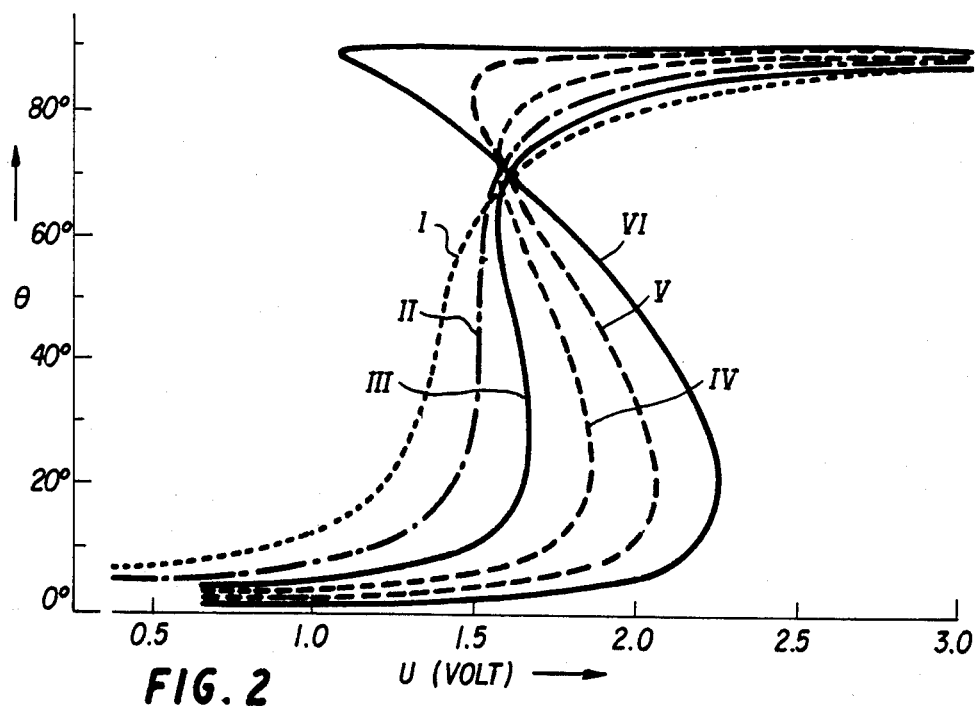
FIG. 2 is a graph illustrating curves with the total twist angle $\phi$ of the liquid crystal as a parameter with the operating voltage U and the tilt angle $\theta$ in the middle of the layer as variables.

FIG. 2 represents, for a typical liquid crystal, the theoretical relation between the tilt angle $\theta$ of the local optical axis (i.e. the director) of the liquid crystal in the middle of the layer and the applied operating voltage U. The angle $\theta$ was measured in relation to the support plate. The tilt angle of the liquid crystal on the support plate in both cases amounts to 28°. The parameter $\phi$, the total twist angle of the liquid crystal within the display cell, runs through the values 210° (curve I), 240° (curve II), 270° (curve III), 300° (curve IV), 330° (curve V) and 360° (curve VI). At a specific layer thickness d of the liquid crystal, the pitch p is so chosen that the d/p ratio is described by the following formula:

$$d/p = \phi/360° \qquad (1)$$

This guarantees that the twisted state of the liquid crystal layer is stable and not twisted by an additional ±180° and that no optical disturbances occur in the display. The values of 210°, 240°, 270°, 300°, 330° and 360° therefore correspond to a d/p ration of 0.58, 0.67, 0.75, 0.83, 0.91 and 1.0. The pitch p is defined in accordance with common usage as the characteristic amount of natural twist produced in the undisturbed nematic liquid crystal by the addition of a chiral additive. The pitch is counted as positive in a system with right-handed twist and negative in a system with left-handed twist.

It is essential to this invention that the magnitude of the ratio of layer thickness d to pitch p of the liquid crystal be in the range of 0.50 to 0.95, preferably between 0.65 and 0.85. The pitch p is adjusted by adding a specific weight percent of a chiral additive to the nematic liquid crystal. The weight percent depends on the type of liquid crystal and chiral additive and on the layer thickness d. Furthermore, it is important that at least one of the orientation layers 8 or 9 aligns the adjoining liquid crystal molecules with a tilt angle greater than 5°, preferably with about 10° to 40°. In this connection, care is to be taken that the alignment of the orientation layers 8 and 9 agree with the natural rotation sense of the liquid crystal 5 doped with the chiral additive. Furthermore, the layer thickness d should be less than 10 $\mu$m and the total twist angle $\phi$ within the display cell should be between 180° and 360°, preferably between 240° and 300°. As a result, it is assured that the transfer characteristic of the display, i.e. the transmission curve as a function of applied operating voltage, is sufficiently steep and the range of the bistable behavior is so narrowed that addressing can take place according to the usual multiplexing technique (cf., e.g., IEEE Trans. El. Dev., Vol. ED-21, No. 2, February 1974, pages 146 to 155) with operating voltages outside this range. It was found that within this range the switching times are at least 100 times longer as outside this range. The transfer characteristic of the display has a similar shape to the curves in FIG. 2, except that the negative slope of the curves (here curves III to VI) should be replaced by a bistable region (hysteresis loop).

Another important point is that the product of birefringence Δn and layer thickness d of the liquid crystal lies within the range 0.6 μm to 1.4 μm, preferably between 0.8 μm and 1.2 μm.

The operation of the liquid crystal display of this invention in transmission can now be explained as follows: the light linearly polarized by the linear polarizer 10 penetrates the support plate 1 and strikes the liquid crystal aligned on the orientation layer 8 at an angle. Because of the total twist φ and the double refracting properties of the liquid crystal, the originally linearly polarized light is elliptically but variably polarized, depending upon the applied operating voltage. The orientation direction of the orientation layer 9 and the direction of vibration of the rear linear polarizer 11 also form a certain angle. The term orientation direction used here is understood to be the projection of the direction of the local optical axis of the liquid crystal immediately adjacent to the orientation layer onto the plane of the orientation layer. The direction of vibration of the polarizer is understood to refer to the vibration direction of the electric field vector of the polarized light. The elliptically polarized light leaving the liquid crystal is absorbed in the rear polarizer 11, either almost completely or hardly at all, depending upon whether the principal axis of the elliptically polarized light is perpendicular or parallel to the direction of vibration of the polarizer 11. An optimum contrast is achieved by suitable choice of the above-mentioned angle between the orientation layers 8 and 9 and of the polarizers 10 and 11. This angle has a magnitude lying between 20° and 70°, preferably between 30° and 60°, with the sense being either clockwise or counter-clockwise. The clockwise sense is defined with respect to the incident direction of the light and the angle is taken in reference to the orientation direction of the orientation layer.

In the reflective mode of operation, the operating principle is essentially the same as in the transmissive mode. In particular, the optimum contrast in a system with only one polarizer 10 is determined by appropriate choice of the angle between the direction of vibration of the front linear polarizer 10 and the orientation direction of the first orientation layer 8.

Figure 4:
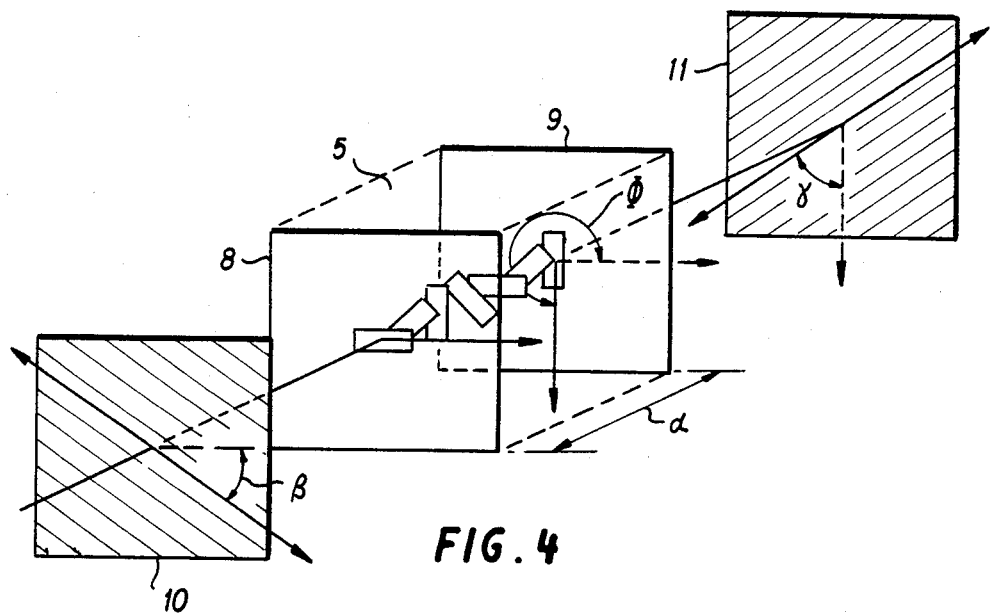
FIG. 4 is an exploded perspective the schematic view of the polarizers in a liquid crystal display according to FIG. 1 for a first mode of operation (yellow mode)
Figure 5:
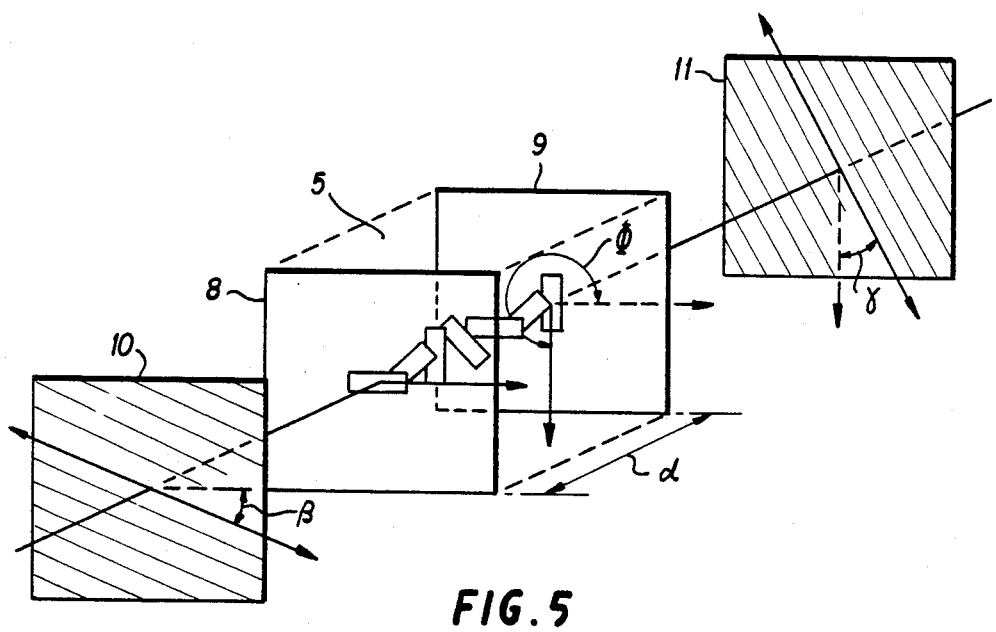
FIG. 5 is an exploded perspective schematic view of the polarizers in a liquid crystal display according to FIG. 1 for a second mode of operation (blue mode)

Because the above-mentioned angle between the direction of vibration of the polarizers 10, 11 and the orientation direction of the orientation layers 8, 9 play an essential role for the attainment of an optimal contrast ratio CR, the way in which these angles are counted will be more precisely explained by means of the schematic arrangements in FIGS. 4 and 5.

FIGS. 4 and 5 show exploded, perspective representations of the arrangement of the polarizers 10 and 11, the orientation layers 8 and 9 as well as the liquid crystal layer 5 located between these layers. The total twist φ of the liquid crystal in the layer is made clear by a chain of liquid crystal molecules which are schematically represented by small rectangular platelets. Support plates, border and possible reflectors have been left out for sake of clarity.

The elements of the cell are arranged along an axis pointing along the propagation direction of the incident light. The direction of vibration of the polarizers 10 and 11 as well as the orientation direction of the orientation layers 8 and 9 are also indicated by arrows which lie in the corresponding planes perpendicular to the above-mentioned axis of the cell.

This axis (incident direction of the light) defines a right-handed coordinate system in which angles are counted as positive in the clockwise sense and negative in the counter-clockwise sense. The examples of the liquid crystal molecules in the cases of FIGS. 4 and 5 therefore form a left-handed screw which has a twist angle φ of −270° in going out from the front orientation layer 8.

The vibration directions of the polarizers 10 and 11 are rotated from the orientation directions of the orientation layers 8 and 9, represented by the dashed lines in the polarizer planes, by the angles β and γ. In the arrangement shown in FIG. 4, both angles β and γ are positive. In the arrangement shown in FIG. 5, only β is positive, whereas γ is negative. In the following description, the angle specifications always refer to the rules laid down in FIGS. 4 and 5.

The invention has especially proven to be useful in a reflective display cell with a layer thickness d of 7.6 μm and a total twist angle φ of the liquid crystal of −270°. The d/p ratio in this case is −0.75. The first orientation layer 8 is produced by oblique vacuum deposition of SiO at an angle of 5° to the plate plane and aligns and adjoining liquid crystal molecules in such a way that the tilt angle between the local optical axis of the liquid crystal at the orientation layer and the projection of this optical axis on the plane plate, i.e. the orientation direction, amounts to 28°. The direction of vibration of the front polarizer 10 and the orientation direction of the orientation layer 8 form an angle of about 30°. The second orientation layer 9 is a rubbed polymer layer which gives a tilt angle of 1°. However, an orientation layer similar to the first one is also possible. The liquid crystal 5 consists of the nematic mixture ZLI-1840 from the firm of Merck, FRG, with 2.05 percent by weight of the chiral additive cholesteryl nonanoate. This liquid crystal has a positive dielectic anisotropy of +12.2 and a birefringence of 0.15. The temperature range extends from 258 K. to 363 K., and the viscosity is $1.18 \times 10^{-4}$ m²/s at 273 K. and $3.1 \times 10^{-3}$ m²/s at 293 K.

With this display cell, 96 lines can be addressed using the usual multiplexing techniques. The operating voltages are 1.90 V for the non-selected state (dark) and 2.10 V for the selected state (bright). In the bright state, the display is completely achromatic, in the dark condition it is deep blue. If, additionally, an optical retardation plate, such as, e.g., a λ/4 plate, is used between the front linear polarizer 10 and the front support plate 1, the color of the display can be correspondingly changed. It has an excellent range of viewing angles independent of the direction of the illumination. The on and off switching times of the display are 0.4 s at 296 K.

Figure 3:
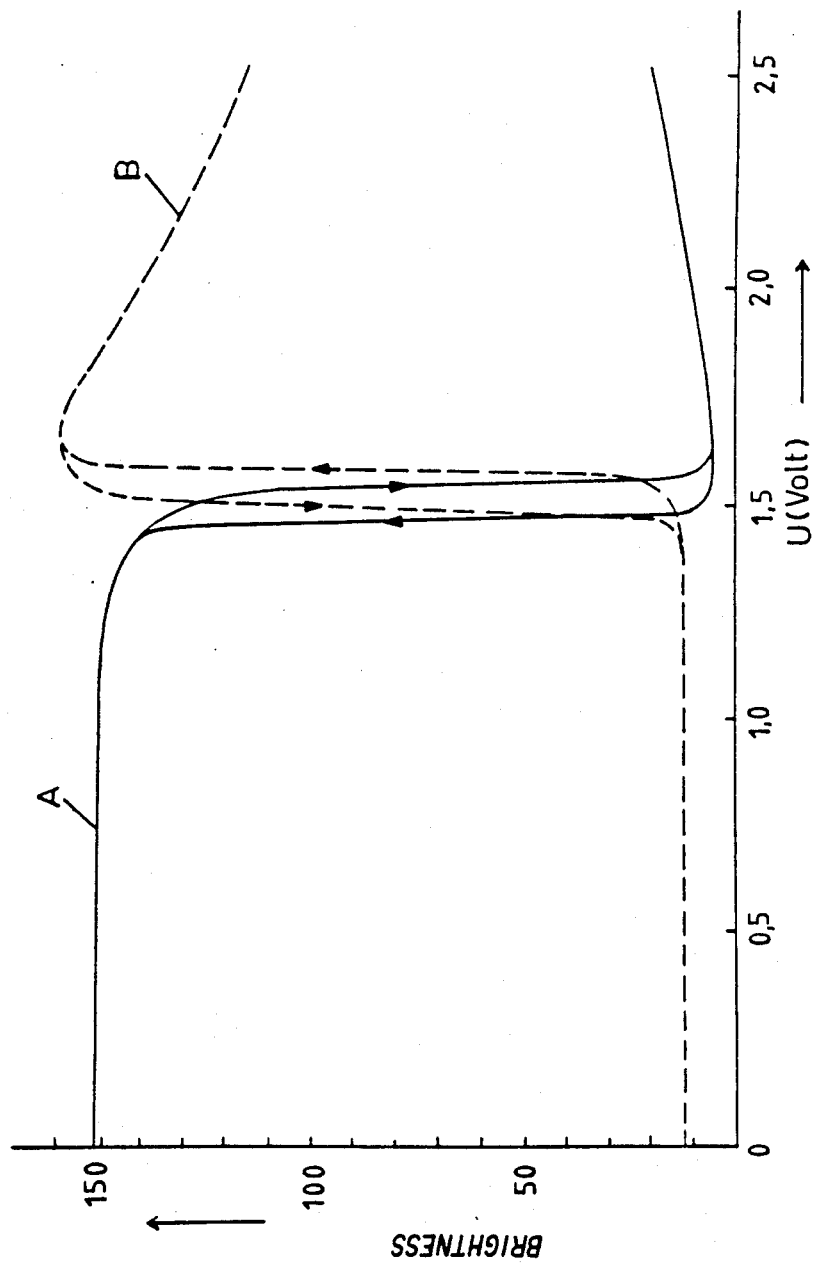
FIG. 3 is a graph illustrating contrast curves for a reflective display cell including two polarizers.

Another especially preferred embodiment of the invention consists of a reflective display cell with a 0.7 mm thick support plate 1 and a 0.5 mm thick support plate 2. The layer thickness is 6.5 μm. This display cell is provided with a front polarizer 10, a rear polarizer 11 and an external reflector 12. Both orientation layers 8 and 9 are prepared by oblique vacuum deposition of SiO at an angle of 50° to the plate plane. These layers orient the neighboring liquid crystal molecules in such a way that the optical axis of the liquid crystal forms a tilt angle of 28° with respect to the plate plane. The orientation layer 8 and 9 are arranged so that the total twist φ makes a left-handed spiral of −250°. As the liquid crystal 5, the nematic mixture ZLI-1840 with a chiral additive of 2.56 weight percent of cholesteryl nonanoate is filled into the cell. The birefringence Δn of ZLI-1840 is 0.15, so that the product Δn×d=0.975. The angle β between the vibration direction of the front linear polarizer 10 and the orientation direction of its associated orientation layer 8 and the angle $\gamma$ between the vibration direction of the rear linear polarizer 11 and the orientation direction of its associated orientation layer 9 are ±45°. Contrast curves are given in FIG. 3 for the case that both angles are +45° or −45° (curve A), and for the case that one angle is +45° and the other angle is −45°, or vice-versa, (curve B). The abscissa indicates the applied voltage U in volts and the ordinate indicates the brightness in arbitrary units. In the first case (curve A) one obtains a bright yellow display in the non-select state and a black display in the select state. This case corresponds to the arrangement shown in FIG. 4 where both angles $\beta$ and $\gamma$ are chosen to have the same sign, positive or negative (yellow mode). In the second case (curve B) one obtains a deep violet display in the non-select state and a bright display in the select state. This case corresponds to the arrangement shown in FIG. 5 where the angles $\beta$ and $\gamma$ are chosen to have opposite sign (blue bode). The measurements were carried out in normally incident light using a Tektronix Model J 6523 photometer. This photometer takes into account the spectral sensitivity function of the human eye. The voltage was swept at a rate of 30 mV/s. The measured contrast ratios at a multiplexing rate of 100:1 are as follows:

| curve A | $V_s$ = 1.580 V | contrast ratio = 19.8 |
|---|---|---|
|  | $V_{ns}$ = 1.429 V |  |
| curve B | $V_s$ = 1.609 V | contrast ratio = 11.8 |
|  | $V_{ns}$ = 1.456 V |  |

The voltages $V_s$ and $V_{ns}$ are the usual select and non-select addressing voltages as given in the article appearing in IEEE Trans. El. Dev. that was already mentioned. The ratio $V_s/V_{ns}$ is then 1.106 for a multiplex rate of 100:1.

In using two polarizers having angles $\beta$ and $\gamma$ relative to the orientation directions according to FIGS. 4 and 5, two general conditions were found which should be fulfilled for an optimized contrast ratio. These conditions can be described as follows:

$$\beta + \gamma \approx \pm 90° \text{ (FIG. 4)} \quad (2)$$

or $$\beta + \gamma \approx 0° \text{ (FIG. 5)} \quad (3)$$

In both cases the range of angles is limited so that $20° \leq |\beta| \leq 70°$ and $20° \leq |\gamma| \leq 70°$ is valid.

When condition (2) is fulfilled (e.g. $\beta = \gamma = \pm 45°$) then one obtains (curve A in FIG. 3) a bright yellow display in the non-select state (yellow mode). If, on the other hand, condition (3) is fulfilled, then one obtains (curve B in FIG. 3) a deep violet display in the non-select state (blue mode).

Figure 6:
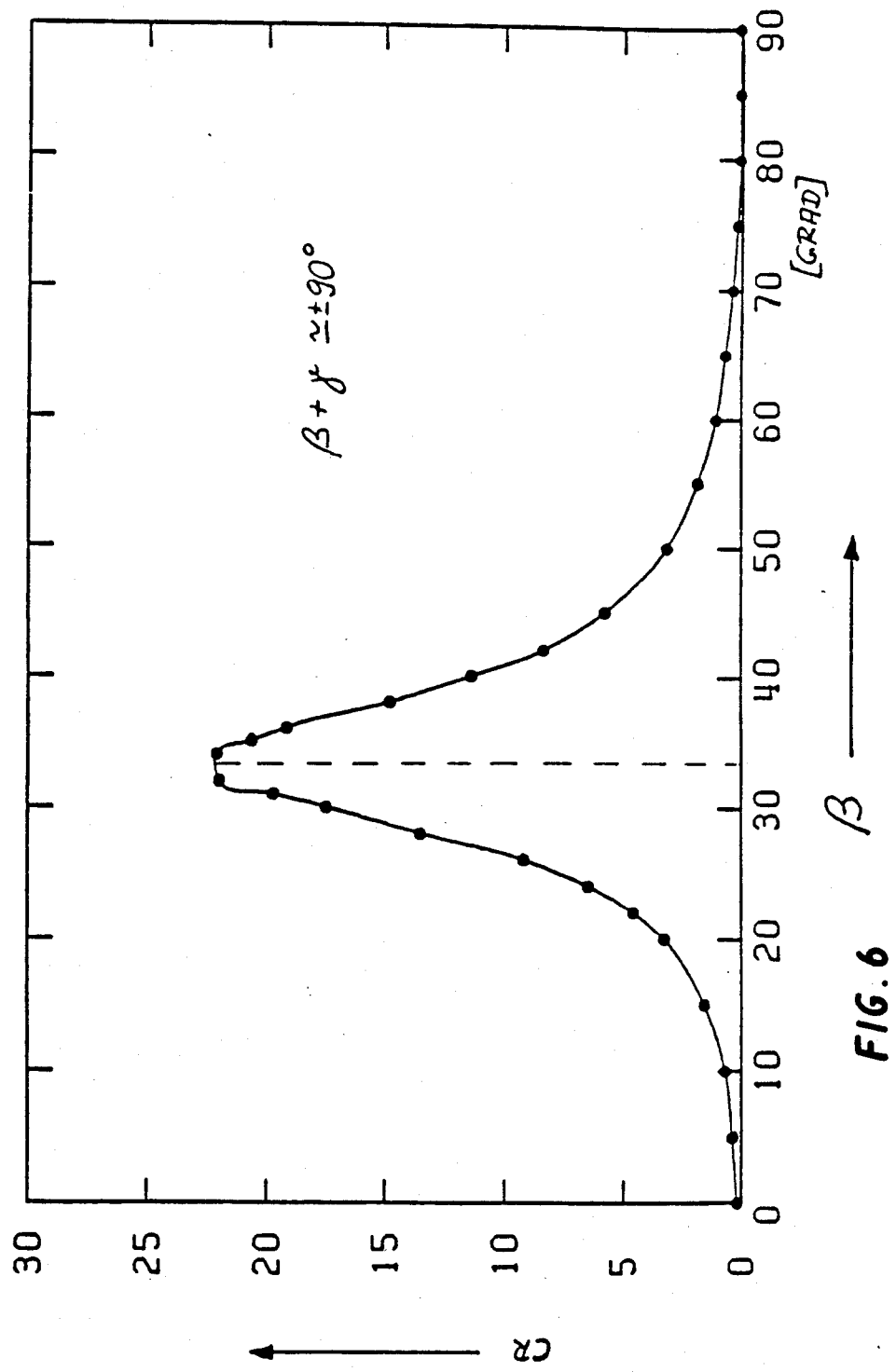
FIG. 6 is a graph illustrating the measured contrast ratio CR as a function of the polarizer orientation in an arrangement according to FIG. 4.
Figure 7:
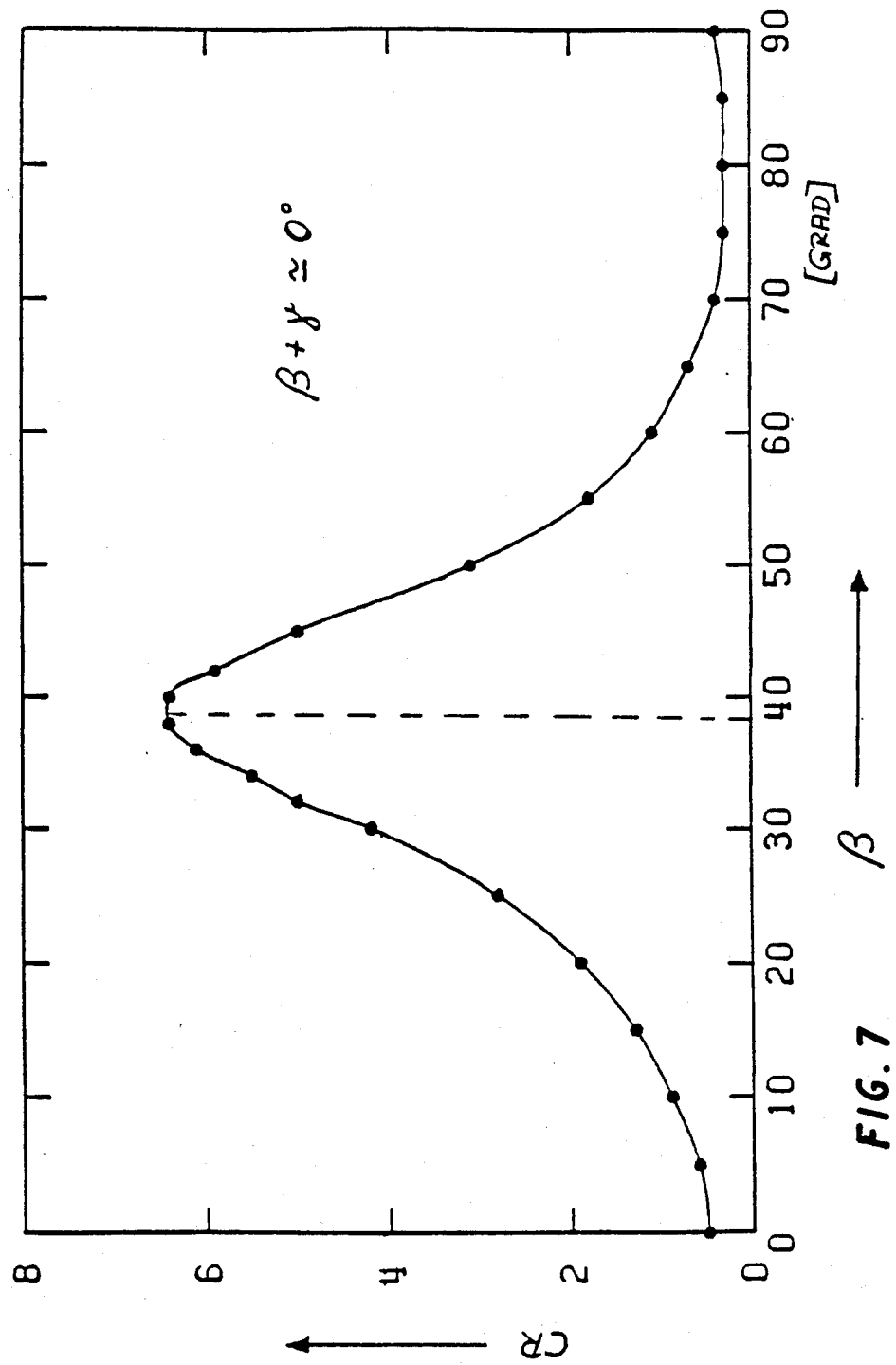
FIG. 7 is a graph illustrating the results corresponding to FIG. 6 for an arrangement according to FIG. 5.

That conditions (2) and (3) are not sufficient conditions for an optimal contrast ratio can be seen from the curves in FIGS. 6 and 7. These curves show the measured contrast ratio CR as a function of the angle $\beta$ under the conditions (2) or (3) for a cell with two linear polarizers in the transmissive mode of operation.

A liquid crystal mixture consisting of 95.6 wt. % ZLI-2392 (Merck), 2.5 wt. % S 811 (Merck) and 1.9 wt. % CB 15 (BDH) was used for these measurements. The total layer twist angle was −270°, the surface tilt angle 24°, the layer thickness 6.3 $\mu$m and the birefringence 0.15.

The results illustrated in FIG. 6 are for the yellow mode ($\beta + \gamma \approx \pm 90°$) and those in FIG. 7 correspond to the blue mode ($\beta + \gamma \approx 0°$). It is recognized that the angle $\beta$ lies around 32° for an optimal contrast ratio CR of about 22:1 in the yellow mode, clearly deviating from 0°.

In the blue mode (FIG. 7) the maximum contrast ratio CR of about 6.5:1 is clearly lower. Here also $\beta$ is about 38°, lying in an unexpected angle region.

Figure 9:
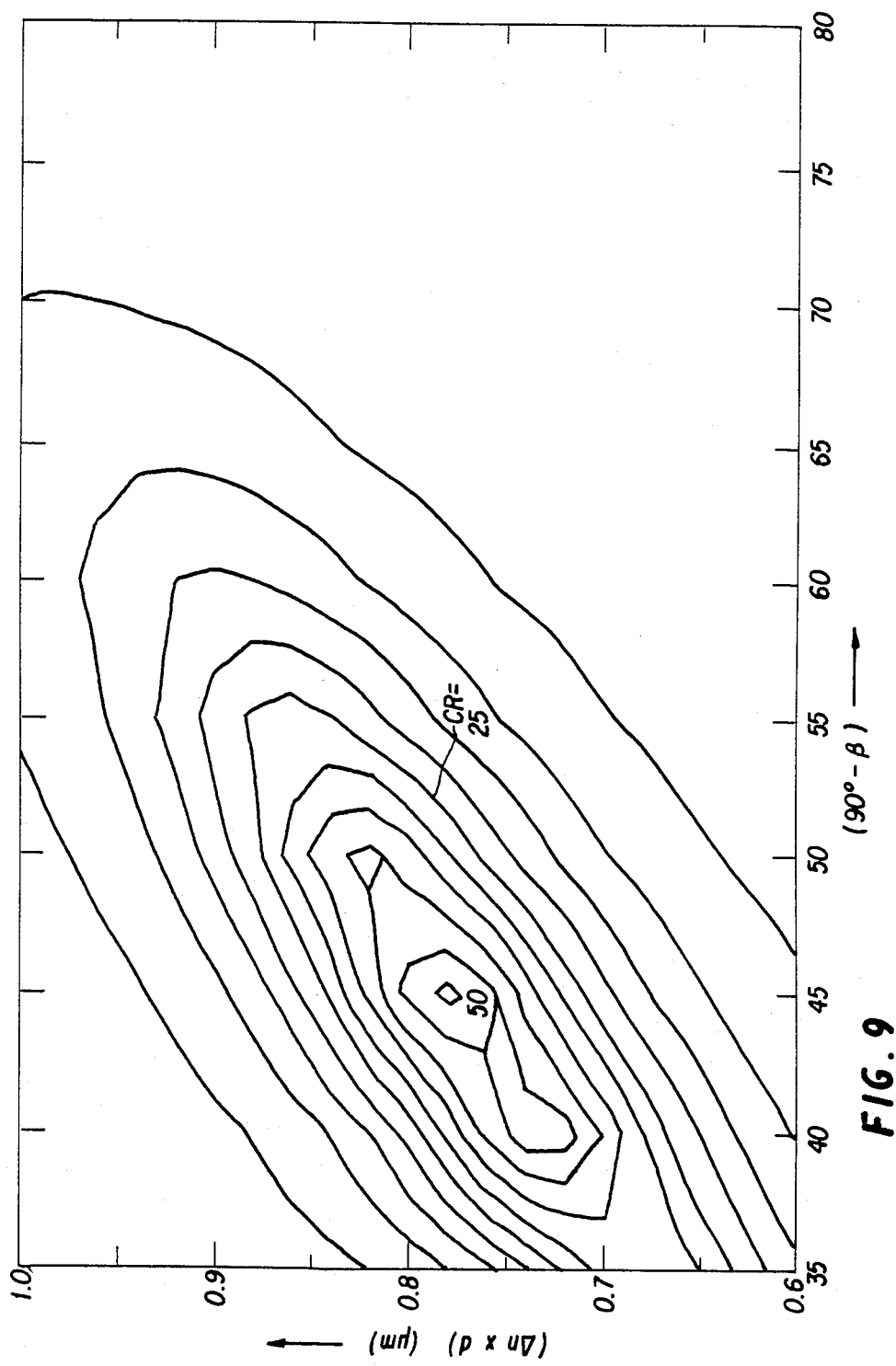
FIG. 9 is a graph illustrating the curves corresponding to FIG. 8 for an arrangement according to FIG. 5.
Figure 10:
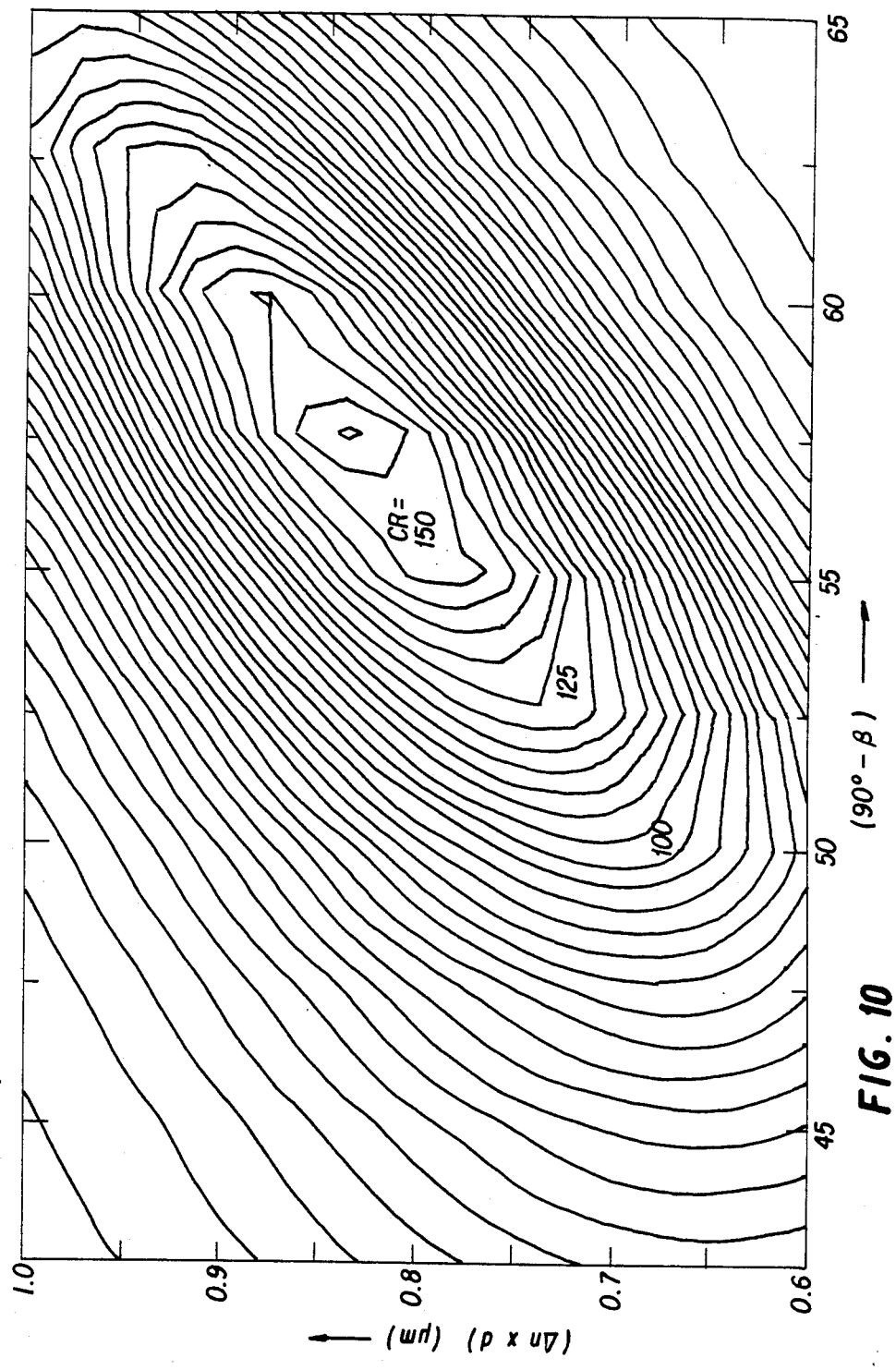
FIG. 10 is a graph illustrating the curves corresponding to FIG. 8 for an arrangement according to FIG. 4.

The surprising values for the angles $\beta$ associated with the optimal contrast ratio CR were confirmed by subsequent theoretical computations. These results are illustrated in FIGS. 8-10 as lines of constant contrast as a function of the product of the layer thickness d and the birefringence $\Delta n$ as well as the angle $\beta$.

For these computations a multiplex ratio of 100:1, a layer thickness of d=6.2 $\mu$m, an ordinary refractive index $n_o$ of 1.5, liquid crystal elastic constant ratios of $k_{33}/k_{22}=2.5$ and $k_{33}/k_{11}=1.5$, a ratio for the dielectric constants of $(\epsilon_{||} - \epsilon_\perp)/\epsilon_\perp = 2.5$, a twist angle of −270° and a ratio of layer thickness to pitch of d/p=−0.75 were assumed.

Figure 8:
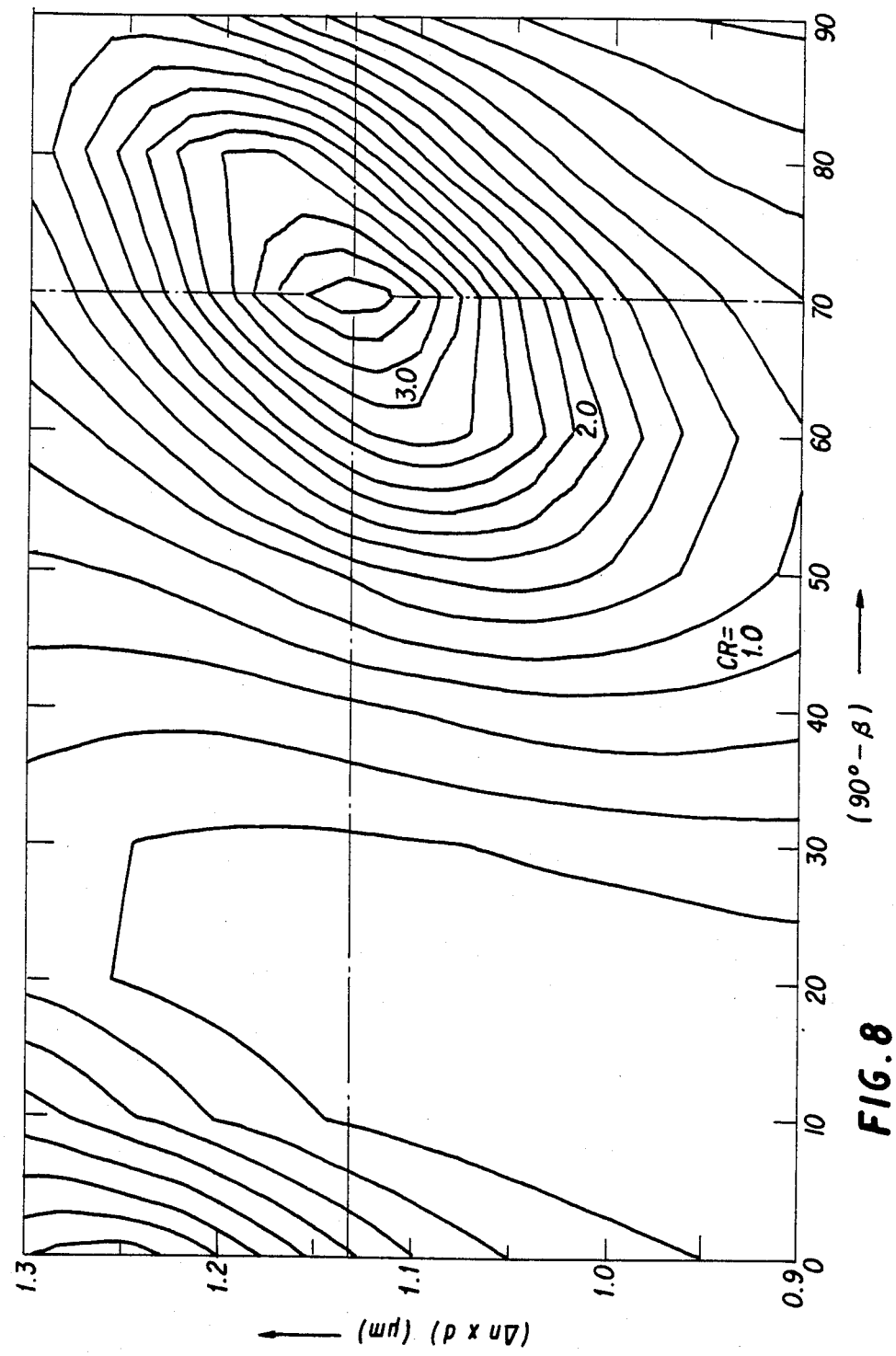
FIG. 8 is a graph illustrating the computed curves of constant contrast ratio as a function of the polarizer orientation and the product $\Delta n \times d$ for an arrangement with one polarizer and one reflector.

FIG. 8 makes it clear that in the case of a cell operating in the reflective mode with one polarizer a maximal contrast ratio CR of about 3.6:1 is only then achieved if the angle $\beta$ is about 20° and $\Delta n \times d$ is approximately 1.13 $\mu$m. For this case a surface tilt angle of 28° was assumed.

In a display cell with two polarizers operating in reflection in the blue mode (FIG. 9) corresponding values of $\beta \approx 45°$ and $\Delta n \times d \approx 0.78$ $\mu$m are obtained.

In the associated yellow mode (FIG. 10) these values amount to $\beta \approx 32.5°$ and $\Delta n \times d \approx 0.84$ $\mu$m. In the last two cases mentioned the surface tilt angle is assumed to be 20°.

The theoretically computed contrast ratios of 50 and 150 lie clearly higher than the measured values because the the computations assumed operation in the reflective mode which gives a better contrast ratio then in the transmissive mode because of the double use of the polarizers.

As a whole this invention makes possible a highly multiplexable, high contrast and fast liquid crystal display having a wide range of viewing angles, which in addition can be manufactured using the proven technology of the conventional TN (Twisted Nematic) display cells.

Obviously, numerous modifications and variations of the present invention are possible in light of the above teachings. It is therefore to be understood that within the scope of the appended claims, the invention may be practiced otherwise than as specifically described herein.

DESIGNATION LIST 1, 2: support plates
3: border
4: spacers
5: nematic liquid crystal
6, 7: electrode layers
8, 9: orientation layers
10: front linear polarizer
11: rear linear polarizer
12: external reflector
13: internal reflector φ: total twist angle of the liquid crystal within the display cell θ: tilt angle of the liquid crystal in the middle of the layer U: applied operating voltage d: thickness of the liquid crystal layer p: pitch of the liquid crystal layer β, γ: angle

FIG. 3:

Helligkeit=brightness

What is claimed as new and desired to be secured by Letters Patent of the United States is:

1. A multiplexible liquid crystal display comprising:
   front and rear plane-parallel support plates which form a cell with inner surfaces and a border;
   a nematic liquid crystal filled into the cell, said nematic liquid crystal having positive dielectric anisotropy and a chiral additive;
   electrode layers formed on the inner surfaces of the support plates;
   orientation layers formed on said electrode layers, which orientation layers align adjoining liquid crystal molecules in such a way that a local optical axis of the liquid crystal at said orientation layers has a tilt angle with respect to the plane-parallel support plates;
   polarizer means for polarizing light at least twice between entering and leaving the display, including at least a front polarizer;
   said support plates separated by a distance less than 10 μm;
   said liquid crystal exhibiting a total twist angle φ in the cell, said total twist having an absolute value which is greater than or equal to 180° and smaller than 360°;
   said liquid crystal having a layer thickness (d) and a pitch (p), wherein the ratio between layer thickness (d) and pitch (p) of the liquid crystal has an absolute value greater than or equal to 0.50 and less than or equal to 0.95;
   said front polarizer having a direction of vibration which makes an angle with the orientation direction of the front orientation layer such that, because of the total twist (φ) and the birefrigence (Δn) of the liquid crystal, the originally linearly polarized light becomes elliptically polarized and the contrast ratio optimal;
   multiplexing means for switching of the display with operating voltages outside any bistable range of the transfer characteristic; and
   spacers distributed over the viewing area of the display.

2. Liquid crystal display as in claim 1, wherein the product of the birefringence (Δn) and layer thickness (d) lies between 0.60 μm and 1.40 μm.

3. Liquid crystal display as in claim 2, wherein said product lies between 0.80 μm and 1.20 μm.

4. Liquid crystal display as in claim 1, wherein the absolute value of the twist angle of the liquid crystal in the cell is between 240° and 300°.

5. Liquid crystal display as in claim 4, wherein the absolute value of the said twist angle is around 270°.

6. Liquid crystal display as in claim 4, wherein the dielectric anisotropy of the liquid crystal is greater than or equal to 5.

7. Liquid crystal as in claim 1, wherein the tilt angle on at least one orientation layer is more than 5°.

8. Liquid crystal display as in claim 1, wherein only one front polarizer and, at the rear support plate, a metallic, diffusely reflecting reflector are provided.

9. Liquid crystal display as in claim 8, wherein an angle (β) between the direction of vibration of the front polarizer and the orientation direction of the front orientation layer is around 30°.

10. Liquid crystal display as in claim 1, wherein said polarizing means comprises said front polarizer and a rear polarizer, wherein there is an angle (β, γ respectively) not only between the direction of vibration of the front polarizer and the orientation direction of the front orientation layer, but also between the direction of vibration of the rear polarizer and the orientation direction of the rear orientation layer.

11. Liquid crystal display as in claim 10, wherein the absolute values of the angles (β, γ) between the direction of vibration of the front and rear polarizers and the orientation direction of the respective orientation layers are greater than 20°.

12. Liquid crystal display as in claim 11, wherein the absolute values of the angles (β, γ) are between 20° and 70°.

13. Liquid crystal display as in claim 12, wherein the absolute values of the angles (β, γ) are between 30° and 60°.

14. Liquid crystal display as in claim 10, comprising:
    a metallic, diffusely reflective reflector provided behind the rear polarizer.

15. Liquid crystal display as in claim 10, wherein the sum of the angle (β) and the angle (γ) is either approximately equal to ±90° or approximately equal to 0°, with the angle being counted as positive in the clockwise sense in the direction of the incident light.

* * * * *

REEXAMINATION CERTIFICATE (1342nd)
United States Patent [19]
Amstutz et al.

[11] B1 4,697,884
[45] Certificate Issued  Aug. 28, 1990

[54] LIQUID CRYSTAL DISPLAY HAVING DEGREE OF TWIST AND THICKNESS FOR IMPROVED MULTIPLEXING

[75] Inventors: Hermann Amstutz, Mellingen; Dieter Heimgartner, Baden; Meinolph Kaufman, Baden-Rütihof; Terry J. Scheffer, Forch, all of Switzerland

[73] Assignee: BBC Brown, Boveri & Company Limited, Baden, Switzerland

Reexamination Request:
No. 90/001,925, Jan. 17, 1990

Reexamination Certificate for:
Patent No.: 4,697,884
Issued: Oct. 6, 1987
Appl. No.: 908,667
Filed: Sep. 17, 1986

Related U.S. Application Data

[63] Continuation of Ser. No. 626,380, Jun. 29, 1984, Pat. No. 4,634,229.

[30] Foreign Application Priority Data

Jul. 12, 1983 [CH] Switzerland ............... 3819/83
Oct. 28, 1983 [CH] Switzerland ............... 5835/83

[51] Int. Cl.$^5$ ............................. G02F 1/13
[52] U.S. Cl. ............................. 350/334; 350/341; 350/346; 350/347 E; 350/337
[58] Field of Search ............... 350/333, 334, 337, 338, 350/341, 346, 347 E, 344

[56] References Cited

U.S. PATENT DOCUMENTS

| | | | |
|---|---|---|---|
| 3,833,287 | 9/1974 | Taylor et al. | 350/349 |
| 3,977,767 | 8/1976 | Okuma et al. | 350/341 |
| 4,426,133 | 1/1984 | Funada et al. | 350/334 |
| 4,596,446 | 6/1986 | Waters et al. | 350/346 |
| 4,810,062 | 3/1989 | Aoki et al. | 350/339 F |

FOREIGN PATENT DOCUMENTS

| | | |
|---|---|---|
| 50-84257 | 7/1975 | Japan . |
| 51-145341 | 12/1976 | Japan . |
| 52-49854 | 4/1977 | Japan . |
| 52-108838 | 9/1977 | Japan . |
| 53-134458 | 11/1978 | Japan . |
| 56-125723 | 10/1981 | Japan . |
| 58-17425 | 2/1983 | Japan . |
| 2074746 | 11/1981 | United Kingdom . |

OTHER PUBLICATIONS

IEEE Trans. El. Dev., Ed-21, 1974, 146-155 (Alt & Pleshlo).
J. Appl. Phys. 48, 1977, 1426-1431 (M. Goscianski).
Appl. Phys. Lett. 18 (1971) 127 (Schadt-Helfrich).
Appl. Phys. 13 (1968) 91 (Heilmeier).
J. Appl. Phys. 45 (1974) 4718.
5th Liquid Crystal Discussion Meeting (1979), 28-29 (Arai, Hiroshima).
26th Applied Physics Societies-Related Joint Lecture Meeting (1979), 118 (Arai, Hiroshima).
27th Appl. Phys. Soc. Related Joint Lecture Meeting (1980) 121 (Arai, Hiroshima).
8th LCD Disc. Meeting (1982) 126-127 (Ishii, Nakagawa, Takamatsu, Funada, Matsuura, Wada).

*Primary Examiner*—S. D. Miller

[57] ABSTRACT

A liquid crystal display based on the bistability effect, wherein the distance between the support plates is smaller than 10 μm and the total twist of the liquid crystal is between 180° and 360°, preferably about 270°. Over the entire viewing area of the display, randomly distributed spacers are provided. Because of these measures, the range of the bistable action is so narrowed that the display can be driven with operating voltages outside this range, using conventional multiplexing techniques. A high degree of multiplexing with short switching times and excellent contrast is obtained. The range of viewing angles is very large and independent of the direction of illumination.

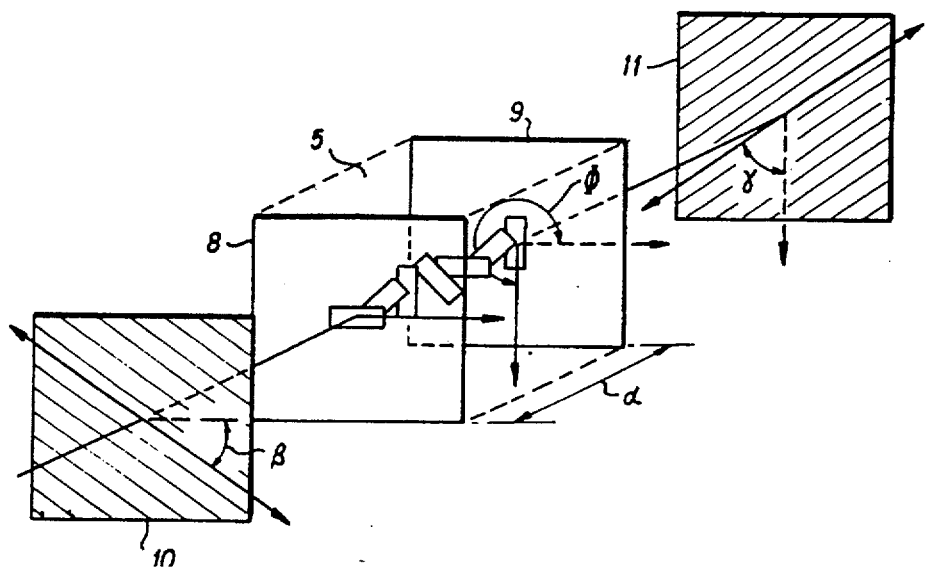

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *